United States Patent [19]
Åhlén

[11] 3,874,254
[45] Apr. 1, 1975

[54] AUTOMATIC REMOTE CONTROL SYSTEM FOR HYDRAULIC TORQUE CONVERTER TRANSMISSIONS

[75] Inventor: Karl Gustav Åhlén, Stockholm, Sweden

[73] Assignee: S.R.M. Hydromekanik Aktiebolag, Stokholm, Vallingby, Sweden

[22] Filed: Sept. 28, 1973

[21] Appl. No.: 401,614

[30] Foreign Application Priority Data
Sept. 29, 1972 United Kingdom .............. 45200/72

[52] U.S. Cl. ...................... 74/856, 74/645, 74/731, 74/752 A, 74/752 C, 192/3.34, 74/753, 74/869
[51] Int. Cl. ...................... B60k 17/00, F16h 47/00
[58] Field of Search ......... 74/856, 731, 732, 752 A, 74/752 C, 645, 753, 866, 867, 868, 869; 192/3.33, 3.34, 3.23, 3.52, 3.57, 3.63

[56] References Cited
UNITED STATES PATENTS
| | | | |
|---|---|---|---|
| 2,568,135 | 9/1951 | Vincent | 74/752 A X |
| 3,001,415 | 9/1961 | Smirl | 192/3.33 X |
| 3,105,393 | 10/1963 | Weinrich | 74/732 X |
| 3,261,232 | 7/1966 | Ahlen | 74/732 |
| 3,387,506 | 6/1968 | Cadiou | 192/3.33 X |
| 3,415,345 | 12/1968 | Cadiou | 192/3.33 |
| 3,552,235 | 1/1971 | Szodfridt | 74/867 X |
| 3,734,252 | 5/1973 | Ahlen | 74/780 X |

FOREIGN PATENTS OR APPLICATIONS
1,932,986   1/1971   Germany .............................. 74/856

*Primary Examiner*—Samuel Scott
*Assistant Examiner*—Lance W. Chandler
*Attorney, Agent, or Firm*—Larson, Taylor and Hinds

[57] ABSTRACT

A remote control system for a vehicle driven by a hydraulic torque converter of the type having a releasable torque transmitting member. Either fluid operated or electrical operating means are provided for sensing the ratio of the speed of the torque converter output shaft to the speed of the torque converter input shaft and controlling fluid lines for connecting and disconnecting the releasable member and/or the brakes assoicated with the torque converter guide member. A remote control valve and throttle operated by the driver of the vehicle operates in conjunction with the operating means to determine the direction and mode of operation of the transmission.

16 Claims, 7 Drawing Figures

AUTOMATIC REMOTE CONTROL SYSTEM FOR HYDRAULIC TORQUE CONVERTER TRANSMISSIONS

BACKGROUND OF THE INVENTION

This invention relates to hydraulic torque converter transmissions for motor vehicles such as trucks, buses, oil tankers and the like, and in particular it relates to an automatic remote control system for such a transmission.

In my copending application Ser. No. 262,514, filed June 14, 1972, and Ser. No. 348,191, filed Apr. 6, 1973, there are described and claimed torque converter transmissions having a releasable pump member arrangement and a releasable turbine member arrangement, respectively. My U.S. Pat. No. 3,734,252, issued May 22, 1973, discloses and claims a forward/reverse gear adapted for use with such a torque converter.

While various types of remote control arrangements have been known heretofore, there exists a need for a new and improved automatic remote control device adapted specifically for use with such torque converters.

SUMMARY OF THE INVENTION

Thus, the purpose of the present invention is to provide an automatic remote control system of the type described.

In particular, it is a primary object of the present invention to provide a remote control system wherein the various phases of operation of the transmission such as double rotation drive, single rotation drive, direct drive, reverse drive, freewheeling and braking are automatically brought into operation by simple movement of a control lever in a direction indicating the desired direction of movement of the vehicle.

In accordance with a first embodiment of the invention, fluid (preferably pneumatic) operated valve and throttle means controlled by the driver are operable, in conjunction with an autopilot system responsive to $n2/n1$ (rotational speed of the torque converter output shaft to that of the torque converter input shaft) controls the flow of hydraulic fluid to determine the position of the guide member brakes, the releasable torque converter member and also the forward/reverse gear.

In another embodiment of the invention, electrical means are provided for sensing $n2/n1$, for controlling the flow of such hydraulic fluid for determining the position of the guide member brakes, the releasable torque converter member and the forward/reverse gear.

BRIEF DESCRIPTION OF THE DRAWINGS

There follows a detailed description of preferred embodiments of the invention to read together with the accompanying drawings in which.

DETAILED DESCRIPTION OF THE PREFERRED EMBODIMENTS

Figure 1:
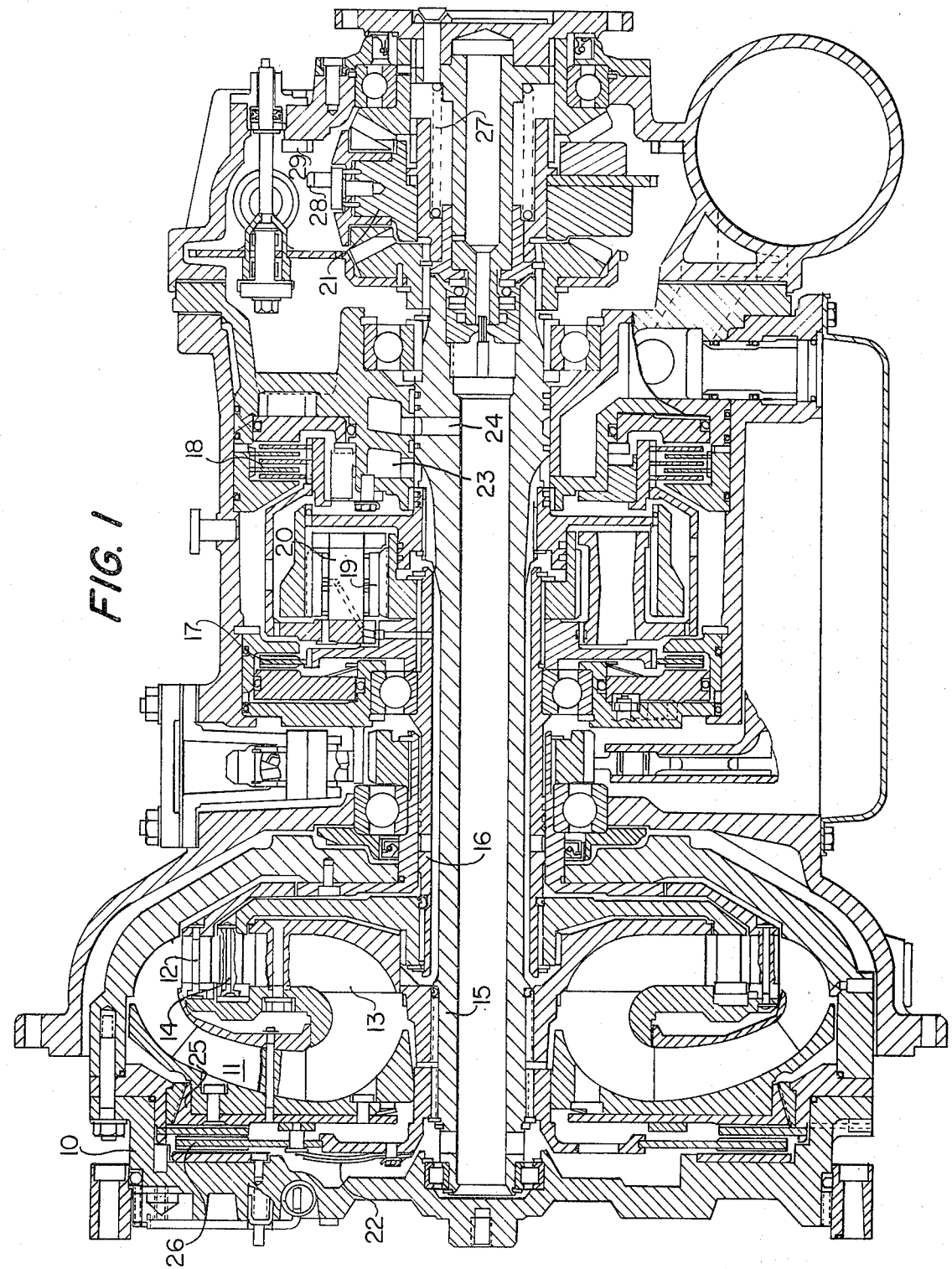
FIG. 1 is an axial longitudinal sectional view of a torque converter transmission.

Referring now to the drawings, like elements are represented by like numerals throughout the several views.

The basic arrangement of the torque converter transmission and its operation will be described with reference to FIG. 1. The torque converter will not be described in detail since all of the parts shown therein are either previously known or are described in my previous pending applications or issued patents, which applications and patents will be referred to below and which are incorporated by reference herein.

The torgue converter comprises a rotating casing 10, a pump member 11, two sets of turbine blades 12 and 13 and an intermediate guide vane ring 14. The turbine blades are carried by a turbine shaft 15 and the guide vanes are carried by a guide vane shaft 16.

In the illustrated transmission, the pump member 11 is used as a servo-piston either to connect the pump member 11 to the rotating casing 10 for hydraulic drive, to let the pump member rotate freely within the rotating casing in a neutral position or to act as a piston for effecting a direct drive connection between the rotating casing 10 and the turbine shaft 15. This releasable pump arrangment is described and claimed in my copending application Ser. No. 262,514, filed June 14, 1972. Reference may be had to that application fro details thereof. However, to facilitate understanding the present invention, the basic operation of the releasable pump torque converter will be briefly described. Hydraulic drive is effected by urging the pump member 11 to the right so that it engages the rotating casing 10 at mating conical surfaces 25. Direct drive is effected by urging the pump member 11 to the left so that it urges a disc member 26 of the turbine shaft 15 into engagement with the rotating casing. The neutral (freely rotating) position of the pump member 11 is effected by moving the pump member 11 to a middle position out of engagement with the conical clutch 25 but not sufficiently far to the left to engage the disc 26 with the rotating casing 10. The said movement of the pump member 11 to the right is effected by introducing pressurized fluid through the passage 24 and through the turbine shaft 15 to the area on the left-hand side of the pump member 11. For direct drive, fluid is introduced through the passageway 23 and through the space between the shafts 15 and 16 to the area within the torque converter chamber to the right of the pump member 11 whereat such fluid urges the pump member 11 to the left. The neutral position is effected by equalizing the pressure of the fluid in the passageways 23 and 24. It will of course be understood that the terms such as "right" and "left" are used only with reference to the specific arrangement of the releasable pump member torque converter as shown in FIG. 1 as other arrangements are also possible.

It will also be understood that the present invention is equally applicable for controlling a torque converter wherein the turbine member containing the turbine blades is releasable from its turbine shaft. The principles of operation for controlling such a torque converter will be essentially the same as for controlling a releasable pump member torque converter and hence will not be described in detail. Such a releasable turbine torque converter is disclosed and claimed in my copending application Ser. No. 348,191, filed Apr. 6, 1973, and the subject matter thereof is incorporated herein by reference for an understanding of such a releasable turbine torque converter.

The torque converter of FIG. 1 is of the so-called double rotating type having one brake 17 for holding the guide vane ring 14 stationary for "single rotation" drive and another brake 18 for holding stationary the axes of planet gears 20 of a planetary gear arrangement for establishing a predetermined speed ratio between the turbine blade ring and the guide vane ring. The brakes 17 and 18 and their associated elements are well known in the prior art and will not be described in further detail herein.

The transmission of FIG. 1 further includes a forward/reverse gear 21. This forward/reverse gear is described and claimed in great detail in my U.S. Pat. No. 3,734,252, issued May 22, 1973, and hence it will not be described in detail herein. However, the operation will be briefly summarized so as to facilitate an understanding of the present invention. This gear is normally kept in a forward drive position under the action of a spring 27. However, by operating a servopiston (not shown) a disc 28 is urged to the right into engagement with a fixed gear 29 to fix the location of the axes of the planetary gears of the forward/reverse gear 21, whereby these planetary gears revolve about their axes to effect reverse drive.

Figure 2:
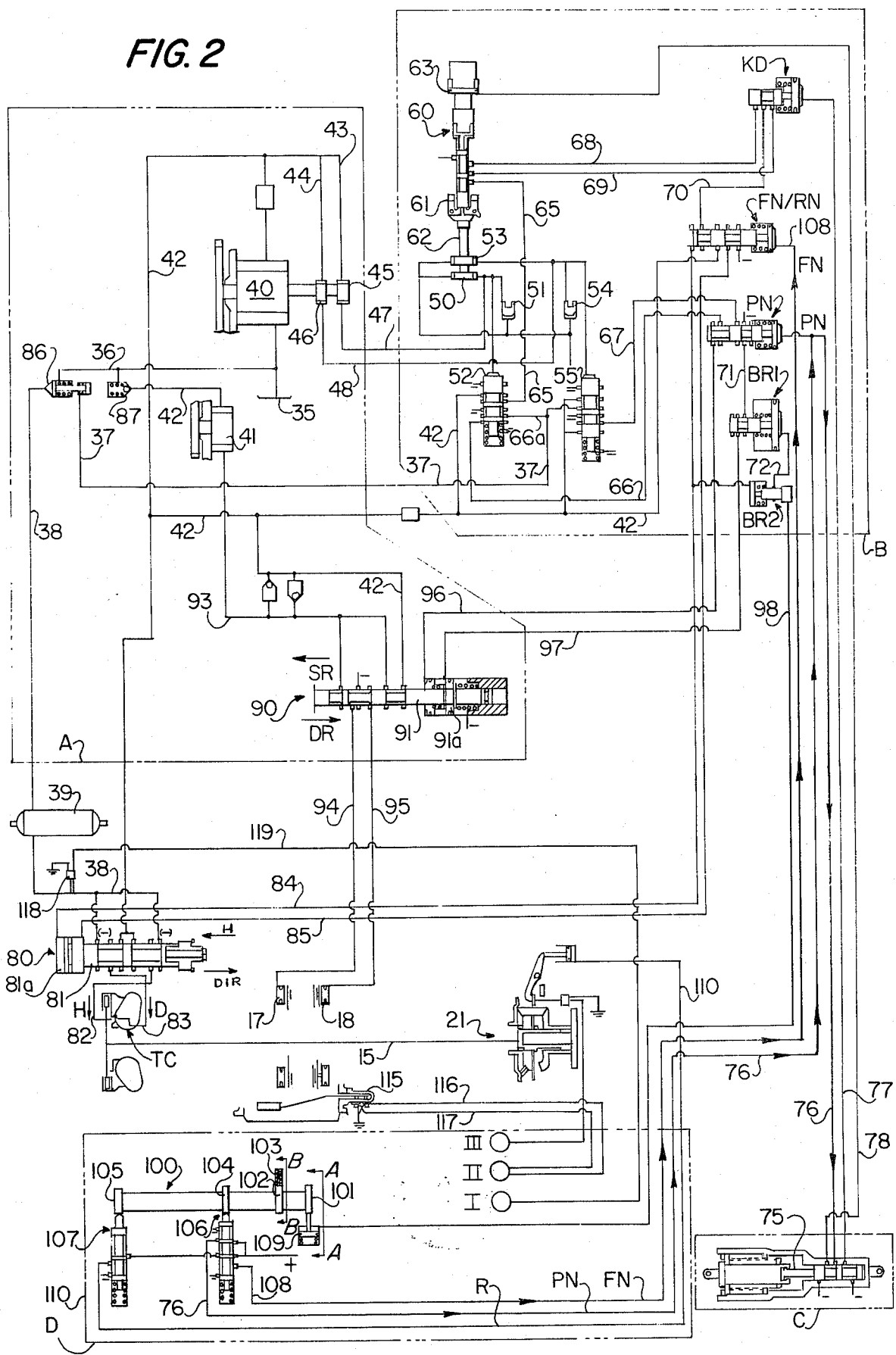
FIG. 2 is a diagrammatic view of a first embodiment of a remote control system for controlling the torque converter of FIG. 1.
Figures 2A, 2B, 3:
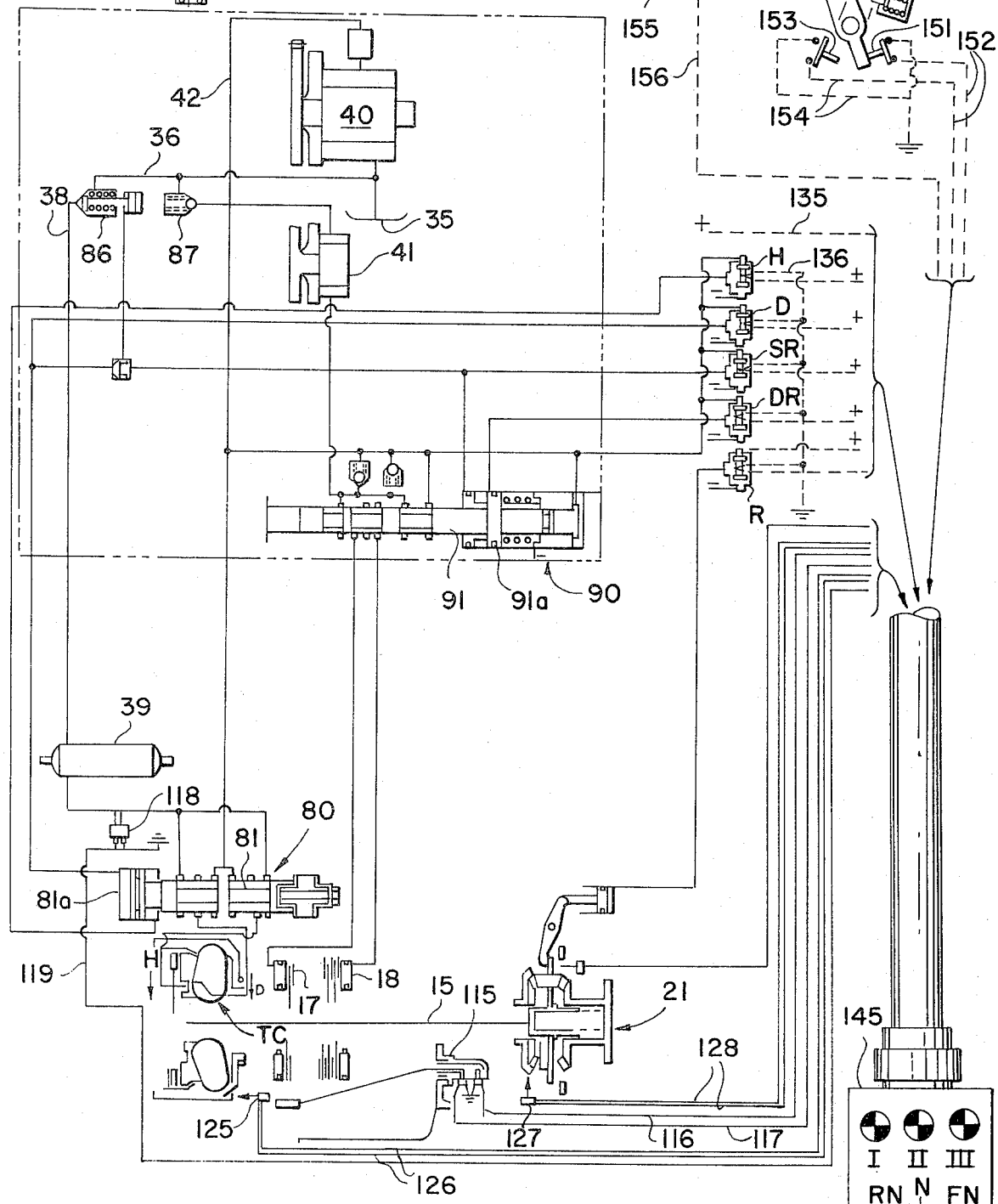
FIG. 2A is a partial end view of a portion of FIG. 2, taken along line A—A of FIG. 2.
FIG. 2B is a partial sectional view taken along line B—B of FIG. 2.
FIG. 3 is a diagrammatic view of another embodiment of a remote control system for operating the torque converter of FIG. 1.

FIG. 2, together with FIGS. 2A and 2B illustrate a first embodiment of a remote control system of the present invention which is essentially a mechanical-pneumatic and hydraulic system. In this drawing, the elements of the torque converter transmission are shown schematically and the control elements, which are also shown schematically, are grouped within boxes outlined by dot dash lines. The box designated as A represents the feeder fluid pump system; the box indicated by the letter B represents the autopilot system; the portion encircled by the letter C represents the throttle valve arrangement and the portion represented by the enclosed dot dash line D represents the driver's valve for the remote control system. Although the system will be described below in detail, it will be noted that the feeder fluid pump system which includes portion A and part of portion B as well as the pump member control valve 80 is described and claimed in my copending application Ser. No. 367,378, filed June 6, 1973, the present invention being particularly concerned with the addition to that system of means for remotely controlling the same.

As described in my said copending application Ser. No. 367,378, fluid from the pump 40 which is driven by the primary side of the transmission delivers fluid to a first line 42 and to second and third lines 43 and 44, the latter two lines delivering fluid to feeder pumps 45 and 46, these pumps also being driven by the primary side of the transmission. Fluid from these pumps enters lines 47 and 48 to the intake of pumps 50 and 53 which are driven via shaft 62 by the secondary side of the transmission. Consequently, the relative speeds of the primary and secondary sides of the transmission will control the fluid pressure in lines 47 and 48, and this variation will operate on maximum pressure valves 51 and 54 and servo-valves 52 and 55 to control the flow of control hydraulic fluid in line 42 to the various control valves 60, KD, FN/RN, PN, BR1 and BR2. These valves in turn control the flow of pressurized fluid to a pump member control valve 80 which controls the flow of fluid to the passages 23 and 24 of the torque converter (see FIG. 1) for effecting direct drive, hydraulic drive or neutral therein or to a brake control valve 90 which in turn controls the engagement of single rotation brake 17 or double rotation brake 18.

As described in said application Ser. No. 367,378, fluid entering lines 47 and 48 initially builds up to the extent permitted by maximum pressure valves 51 and 54. The existence of pressure in lines 47 and 48 further depresses the servo-valves 52 and 55. Subsequently, as the speed of pumps 50 and 53 increases (as the secondary side of the transmission increases its speed) the pressure in lines 47 and 48 will decrease, thus permitting the valves 52 and 55 to return under the action of spring means. This return movement will open up various lines, as will be explained below, to permit fluid to flow from these valves 52 and 55 through connecting lines 65 to the valve 60 and 67 to the valve PN. In addition, these valves include drain lines 37 leading back to the line 36 which communicates with the reservoir 35. The system also includes maximum pressure valves 86 and 87 which are part of the normal torque converter system and determine different levels of pressure in the blade systems and are not essential for understanding the present invention and are hence not described in detail.

The basic feeder fluid system also includes a pump 41 which receives fluid from line 42 and in turn delivers fluid via line 93 to the valve 90. This valve 90 includes a spool 91 and a piston member 91a, this valve in turn determines whether pressurized fluid flows through line 94 to engage the brake 17, line 95 to engage the brake 18, or neither of these brakes (the freely rotating position of the torque converter).

The pump member control 80 includes a spool 81 and a piston 81a, the latter receiving fluid via line 84 for movement in a first direction (to the right) for direct drive and through a second line 85 for movement to the left to effect hydraulic drive. In the illustrated position, the fluid from line 42 passes through both of the lines 82 and 83 and hence enters both of the passageways 23 and 24 to place the pump member 11 in a neutral, freely rotating position. It will be seen that when the piston 81a moves to the right, fluid from line 42 will enter only the line 83 and will connect the line 82 to reservoir (via line 38, heat exchanger 39, valve 86, and line 36), thereby urging the pump member 11 to the left (as in FIG. 1) to effect direct drive. On the other hand, fluid through line 85 will move the piston member 81a to the left causing fluid from line 42 to pass through line 82 while line 83 is connected to drain, thereby urging pump member 11 to the right (as in FIG. 1) to effect hydraulic drive.

Also shown in FIG. 2 is a throttle valve 75 with which fluid lines 76, 77 and 78 communicate. The line 76 selectively delivers pneumatic fluid to the valve 75 (as will be explained below), and this fluid can be delivered either through a first fluid line 77 to the kick down (KD) valve or through line 78 to the centrifugal regulator valve 60.

The driver's control valve D includes a main valve 100 having thereon a reverse lock cam 101 which includes a slot 101a having a detent 101b. The purpose of these elements are to prevent movement of the shaft 100 to a reverse position (clockwise in FIG. 2A) unless fluid is delivered above the piston 109, thereby urging the same downwardly against the force of the spring means shown therein.

As illustrated in FIG. 2A, this valve has five positions, a neutral position (PN), a forward-neutral position (FN), a forward position F, a rear-neutral position RN and a reverse position R. These five positions are specifically located by engagement of a detent 103 into the five notches on the cam 102 of the shaft 100, as shown in FIG. 2B.

The flow of control fluid for effecting engagement of the torque converter members and the brakes 17 and 18 is controlled by the valve 106 which is in turn controlled by the cam 104 on the shaft 100. At appropriate positions, this valve directs pneumatic fluid to either the line 76 which leads to the throttle valve 75 for delivery to either of the lines 77 and 78 as well as directly to the PN valve. Also leading from this valve 106 is a line 108 delivering fluid to the FN/RN valve. The ultimate direction of rotation is controlled by the cam 105 on shaft 100 which operates the valve 107 which in turn controls the flow of pneumatic fluid through line 110 to the servo valve which will in turn move the disc 28 (of FIG. 1) to the right to engage the gear 29 to effect reverse drive.

Also included at the driver's valve are indicators I, II and III. Indicator I is connected via electrical connector 119 to a temperature sensing device 118 for sensing the temperature of oil in drain line 38. Indicators II and III are connected via electrical connection 116 and 117 to an oil level indicator 115.

The operation of the remote control system of FIG. 2 will now be described by describing separately each of the various driving conditions.

Released Condition

In this condition, which is shown in FIG. 2, the pump member 11 of the torque converter is released completely from the rotating casing 10 and both of the brakes 17 and 18 are also in the released condition.

On starting the engine, the casing 10 rotates with the engine, but only a small torque is transferred to the turbine blades 12 and 13 since the pump member 11 is not connected to the casing. The engine can now be tested up to maximum speed, but because of the small torque which carries over even with the pump member free, the vehicle brakes must be on. At this time the driver's valve is in the PN position. The reverse gear 21 is connected by the said spring 27 in the forward position.

After the engine has run for a few moments, the indicators I and II should not yet light. Before starting, if the vehicle had been standing a long time, the oil from the circuit would have drained out into the sump, giving perhaps more than the maximum oil level. Therefore, after running for a moment or so if there is sufficient oil, the indicator 115 should not be to low to light the indicator lamp II.

The fluid lines as shown in FIG. 2 effect the said neutral positions of the pump member 11 and the brakes 17 and 18 as follows. Concerning first the pump member 11, fluid from line 42 passes into both of the lines 82 and 83 to keep the pump member free of the casing 10. This position of the valve spool 81 is effected by connecting the two fluid lines 84 and 85 to drain through the FN/RN valve, the right-hand position of which is not offset by any fluid in line 108 because this line is connected through the valve 106 to drain when the shaft 100 is in the PN condition as illustrated. Similarly, the brakes 17 and 18 are disconnected because the two lines 94 and 95 are connected to drain at the valve member 90, which valve member is in its neutral position because the two connecting lines 96 and 97 connected respectively to the PN valve and the BR1 valve do not have their righthand positions counteracted by any fluid force. The righthand side of the PN valve is connected to drain via line 76 and valve 106. Similarly, with the BR1 in the right-hand position, the line 97 is connected to drain via the BR1 valve, fluid line 71 and the PN valve.

When the engine has been running for some time at idling speed and has eventually been completely tesetd up to maximum speed which, as indicated can occur without any change in the driving conditions, the driver may prepare for moving the vehicle. This is done by moving the throttle valve into the forward or reverse neutral positions (FN or RN). It will be understood that the connections of elements 11, 17 and 18 are essentially the same whether the vehicle is to be driven in forward or in reverse, the only difference being that in reverse the gear 21 is additionally actuated. When the shaft 100 is turned to the forward neutral (FN) condition, firstly the double rotation brake 18 is closed. It will be seen that this results because the downward movement of the spool of valve 106 connects the pressure fluid with line 76 which in turn urges the PN valve to the left connecting the lines 67 and 71. Line 67 receives pressure from line 42 via valve 55 which has been pushed downwardly because of pressure in line 48; and in turn the line 71 delivers pressurized fluid across the valve BR1 to line 97 and hence to the side of the piston 91a of valve 90, urging the valve spool 91 to the right to connect pressurized fluid from line 93 to the line 95.

In accordance with the above, the engine has now been started, the hydraulic system is in operation and the double rotation brake 18 has been connected, but torque is still not being transferred since the pump member 11 is still disconnected form the casing 10.

Double Rotation Drive

The transmission is now prepared for connection of the drive, and this is now effected by moving the driver's valve to the forward position whereby the valve spool 106 is moved downwardly so that pressurized fluid is delivered into the line 108 to urge the FN/RN valve to the left. This connects the pressurized line 42 through the said FN/RN valve to the line 85 for delivery to the right-hand side of piston 81a urging the latter to the left thereby causing fluid to flow across the valve 80 into the line 82 to connect the torque converter for hydraulic drive. Each time that the vehicle stops and the driver's valve is moved from the F position to the FN position, it will be seen that the pump member 11 will be disconnected from the casing 10 although the brake 18 will remain connected. This is possible because it takes such a short time, for example 0.1 seconds, to connect the pump 10 and the casing 11, and this connection starts the circulation of fluid within the torque convereter thereby initially applying torque very softly and smoothly across to the turbine member. In fact, even if the driver was in a hurry and pressed down on the throttle valve simultaneously with moving the driver's valve, there would be a reasonably soft connection while if the DR brake is connected to the engine at speeds higher than idling speed, there would be a very hard shock. Therefore, the driver's technique here should be, when the vehicle is moving towards a stop, that the driver returns the driver's valve to FN to cause the engine to return to idling speed as soon as possible with the lowest possible fuel consumption. When he wishes to start driving, he can then move the driver's valve manually over to F, simultaneously pressing down on the throttle.

Regarding the conditions of shift between forward and reverse, of towing the vehicle with non-rotating engine, and coasting by free-wheeling, these will be referred to later. As regards towing the vehicle with the engine stationary, this can be effected in the FN position of the driver's valve. At this position the turbine blade ring and the guide vane ring 14 and the planet gears 19 will rotate and will also drive the pump member 11, while the rotating casing 10 is stationary. Since the casing 10 is stationary, there will not be any circulation of feeder fluid, and therefore towing at very high speeds is not recommended. However, towing up to 50% of the max. speed is continuously allowable, and up to 80% of the max. speed is allowable momentarily, for short distances. (If towing is to be made at max. speed and over long distances, the transmission should be supplied with an arrangement to hold the reverse gear in a neutral position. This can be made with a special screw.)

Single Rotation Drive

When the vehicle reaches a predetermined speed such that the speed ratio $n2/n1$, i.e., the speed of the secondary side of the transmission to the speed of the primary side of the transmission has been reached, a shift will automatically occur from double rotation to single rotation; that is, the brake 18 will automatically be disconnected and the brake 17 connected. The manner by which this occurs is the subject matter of the said application Ser. No. 367,378. However, for purposes of completing the present disclosure, this operation will be explained herein. When the critical speed ratio is reached, the pump 53 driven by the secondary shaft of the transmission reaches the same capacity as the pump 46 driven by the primary shaft. The pressure holding the valve 55 down is then removed, and the valve is returned by its spring to its original upward position, venting fluid line 67. It will be noted here that while the pressure of line 47 also decreases as the secondary shaft speed increases, its setting is such that its valve 52 does not rise upwardly until a higher speed then the said critical speed ratio associated with changing from direct drive to single drive. Thus, at this moment the line 67 is vented through the valve 55. However, the line 66 which is in a downward position now receives pressurized fluid via line 66a from valve 55 which in turn receives such pressurized fluid from line 42. This pressurized fluid in line 66 is now delivered across the PN valve to the line 96 so as to urge the valve 91 to connect fluid line 93 with the single rotation fluid line 94.

It is advisable to have a certain time-lag or hysteresis between single rotation and double rotation drives and vice versa. This is obtained by the return valve arrangement for the quotient regulator valves 52 and 55 so that leakage is allowed through these valves, which leakage channel is closed at the moment when the primary shaft pump capacity again becomes sufficiently high to compensate for the release and buildup of pressure. This means that between the shift points there should be a certain speed ratio difference. To make this quotient regulator less dependent on volumetric efficiency, the primary side pump 40 is fed from the basic fluid system, whereby the leakage through the primary side pumps 45 and 46 is partially compensated for by leakage through the secondary side pumps 50 and 53. Due to the changed relationships between resistance and load there can be shifts up and down between single rotation and double rotation.

Direct Drive

At still a higher speed ratio of n2 over n1, the valve 80 shifts to move the pump member 11 from hydraulic drive to direct drive. Again, this operation is explained in detail in the said copending application Ser. No. 367,378, but it will be described herein also for purposes of completing the present disclosure.

This shift utilizes the pumps 45 and 50 and the connecting fluid line 47 with which is associated the quotient regulator valve 52; and in addition this shift utilizes the centrifugal regulator valve 60 having associated therewith governor weights 61. When the capacity of pump 50 becomes high enough, the pressure in line 47 is reduced, thereby reducing the pressure at the end of valve 52, causing the same to rise upwardly. This connects pressurized fluid from line 42 across the valve 52 to the line 65 which leads to the valve 60. At this time, because the secondary shaft is rotating rapidly, the weights 61 are outwardly whereby the line 65 is connected with line 69 which passes the pressurized fluid through the KD valve (which at this moment is in its right-hand position) to the line 70. Noting that the FN/RN valve is now urged to the left, this line 70 communicates with line 84 to the left-hand side of piston 81a, thereby urging the valve spool 81 to the right for connecting pressurized fluid to the line 83 for directly driving the torque converter in the manner specified above.

Figure 4:
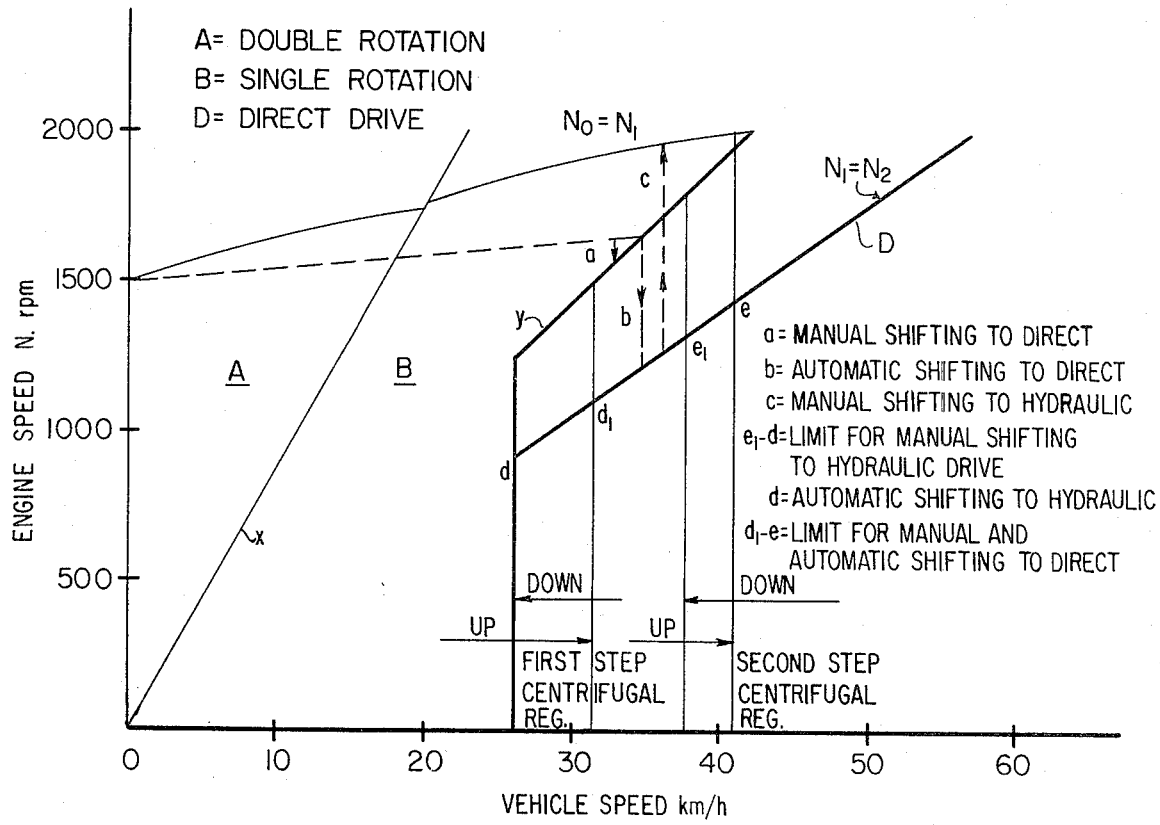
FIG. 4 is a graph showing the relationship between engine speed in revolutions per minute and vehicle speed.
Figure 5:
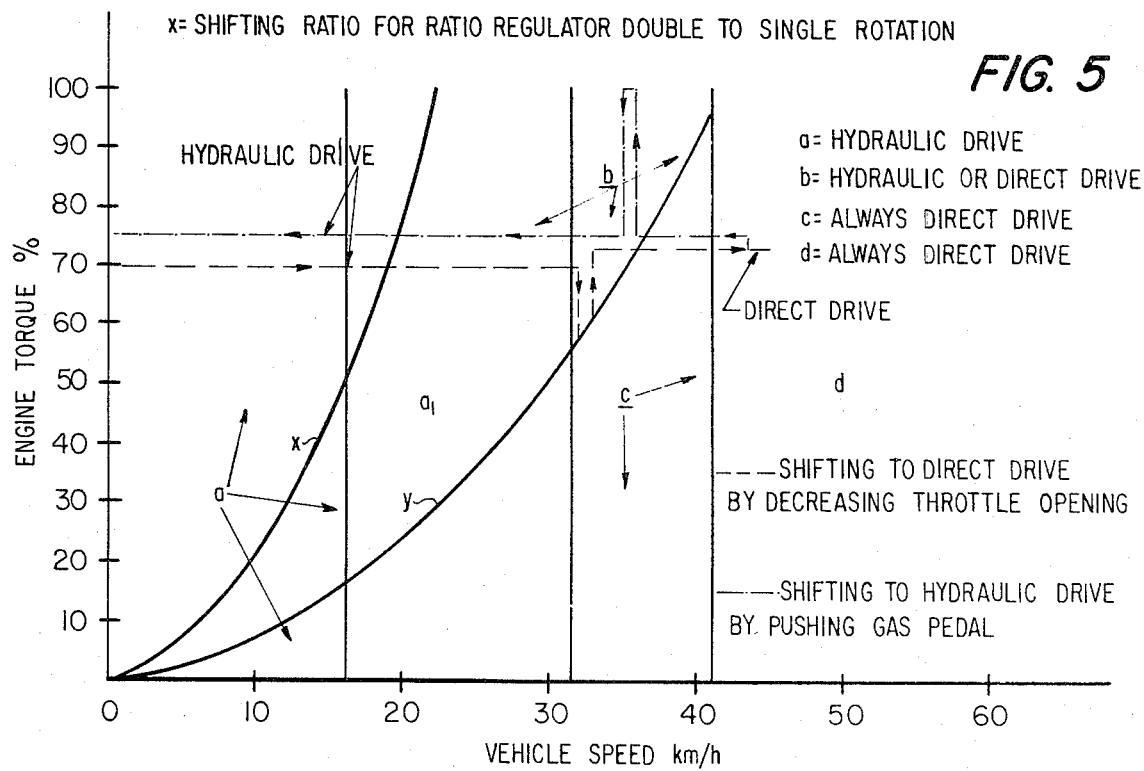
FIG. 5 is a graph showing the relationship between the percentage of maximum engine torque and vehicle speed.

In the diagrams of FIGS. 4 and 5 are shown fields, where direct drive should be used under certain conditions. In the fields c and d direct drive should always be used. In field al direct drive should be used only when the throttle is at idling position, which would appear to be rather complicated.

There are two reasons for utilizing direct drive down to a very low speed (high idling); Firstly, release of direct drive when passing a hill top at higher speed gives an uncomfortable feeling, and then with hydraulic braking this will give a still more noticeable uncomfortable feeling.

At "drive" the engine will not allow direct drive down to more than definite speed, and above a certain speed of the vehicle only direct drive is allowed to be used. In the field between the release point when driving and the definite connection point there is a field where hydraulic drive can be used when maximum tractive effort is wanted, and direct drive can be used when the tractive effort in direct drive is sufficient. The automatic arrangement is such that in this field, direct drive can either be picked up by releasing the throttle for a moment or pressed to disconnect the direct drive for hydraulic drive by pressing down the throttle to its deepest position. However, in hydraulic drive, this picking up of direct drive or going back to hydraulic drive is possible only above a certain speed ratio. The arrangements include the centrifugal regulator 61. When the centrifugal regulator is speeded up with the throttle valve 75 in neutral as shown, the regulator is loaded by two springs. If the throttle is pressed down, then the throttle valve supplies pressure air via line 78 to lift piston 63 and hence one of the springs. This gives the centrifugal regulator two first step shift points and also two second step shift points. This means that at no throttle, even the second step will shift down at a lower speed. The shift points on the diagrams of FIGS. 4 and 5 are:

1. Shift point (vertical line 16 km/h) down, released throttle, used for positive disconnection of direct drive when retarding for a stop or retarding by means of hydraulic braking;
2. Shift point (vertical line 26 km/h) down, when driving in direct drive and decelerating.

To obtain direct drive the following two conditions are necessary:
 a. The first centrifugal regulator step is out;
 b. The quotient regulator has shifted over, line y. Both the centrifugal regulator valve and the quotient regulator valve 52 have a hysteresis. When there is a question of down-shift, the lowest point is meant; when up-shift, the highest point is meant.

When the second step of the centrifugal regulator valve 60 is out, and the quotient regulator valve 52 is out, then direct drive is positive. When the second centrifugal regulator step is back and only the first out, it is possible by manipulating the throttle pedal to select hydraulic drive or direct drive. In connection with this there are many influencing factors. For fuel saving an earlier shift is advisable. Therefore a shift over to direct drive should be made, as soon as an identical feeling of tractive effort is obtained with both drives. It would be ideal if the lower limit for connection of direct drive could be related to the throttle opening, following the allowed load curve for the engine.

The diagram of FIG. 2 shows the throttle valve 75, which influences the centrifugal regulator valve 60 and the socalled kick-down valve KD. Schematically, it is also possible to see how the different centrifugal regulator points would be obtained. There would be small and big weights, of which the big weights only could displace the valve 60 a first distance, and the small weights could push it a further distance. Also the arrangement for two levels of spring loads is apparent. The quotient regulator valve is set in association with the pump capacity of the pump 50, which is equal at the border line y on the diagram of the Figures. Below this line a valve is pressed down against the spring, above the point it takes the opposite position because of the change of oil pressure from plus to minus. The valve 90 has a passage which closes as soon as the valve starts moving, giving a fast movement between the end positions. The system has a non-return valve for the case when the secondary side pump capacity is larger than that of the primary side. Release of the extra capacity of the primary side pump takes place through the valve in its down position.

The effect of the release of the valve 90 is that the valve 80 moves to the position for direct drive, simultaneously as the maximum pressure level in the system is reduced, which also can be seen from FIG. 2. The pressure fluid actuating the servo-motor 81a of the valve 80 passes first through the centrifugal regulator valve 60, then the kick-down valve KD, and finally the FN/RN valve.

It will be seen from FIG. 2 that for the supply of the pressure fluid to pass to the valve 80 it is necessary either that the kick-down valve KD is not pressed in and the first centrifugal regulator step is out, or that both the centrifugal regulator steps are out, while the kick-down position is eliminated. The first requirement is, of course, that the quotient regulator valve 52 provides the possibility for direct drive at all as explained above. The FN/RN valve is still operated from the driver's valve and is pressed in to make the torque converter ready for drive, that is during driving it is always in actuated position. The PN valve is also actuated from the driver's valve and also in the actuated position during driving. The release of the direct drive follows either when the second centrifugal regulator step is reversed and kick-down is effected, or when both the first and second centrifugal regulator steps are reversed.

Free-wheeling

When driving in direct drive and coasting, it is possible to get a free-wheel action by moving back the driver's valve to FN, which releases the pump member 11 and therewith also the direct drive. This allows the engine to slow down, which results in fuel saving and higher coasting speed.

The setting of the automatic control means is influenced by the release throttle, but otherwise they stay in position. The desideratum is to obtain a smooth reconnection. Therefore first the throttle should be depressed to accelerate the engine, wheich will minimize the speed difference. If direct drive is connected, and which, if the speed of the vehicle is below the speed for connection of direct drive, will connect hydraulic braking, and thereafter, if conditions demand, will connect the direct drive.

Hydraulic Braking

When in direct drive with the throttle released it is possible to connect hydraulic braking, which is effected by connecting the double rotation brake 18 simultaneously with the direct drive. This is done by feeding the brake valves with pressure air from the vehicle brake system. There is a safety valve which guarantees that the pressure air reaches the brake valve only if direct drive is connected. This is necessary to avoid influence on normal drive starting. If, however, direct drive is connected, the valve 80 is positioned for double rotation.

Under certain circumstances first single rotation and then double rotation braking may be connected. Such an arrangement can be made by connecting double rotation brake 18 at a higher vehicle brake air pressure than at single rotation. This, however, has to be made with the same valve making simultaneous connections impossible. The reason for this arrangement is that for a bus connection of double rotating braking at top speeds or over speed and with an empty bus too high retardation may arise. Normally, however, only double rotation braking arrangements are supplied.

Reverse Gear

The control of connection of forward and reverse respectively requires certain safety arrangements, such as that the vehicle has to be standing still and the engine should run at low speed.

There is a mandatory requirement that the vehicle shall be standing still during shifting to reverse and therefore there is a ratchet 101*b* which makes shifts between forward and reverse impossible except when the brake pedal is pressed down hard to move the piston 109 downwardly against its spring.

Due to the design of the driver's valve it is ensured that the pump part of the torque converter is released and that also both the brakes 17 and 18 are released, before shift between forward and reverse takes place. This shift to reverse takes place when shaft 100 turns clockwise (as in FIG. 2A) whereby cam 105 moves valve 107 downwardly connecting pressurized fluid via line 110 to the servo piston of reverse gear 21. There is a theoretical possibility of moving the throttle valve so fast that the pump member does not have time to release, but to make such a fast movement difficult, cam 102 and detent 103 make the driver stop the movement in two positions when passing over from forward to reverse and vice versa. It is believed that this arrangement is sufficient. As a second safety step a ratchet, making it possible to pass from positive to neutral, only with delay, may be inserted.

FIG. 3 illustrates schematically another embodiment of the invention. The system of FIG. 3 is the equivalent of the system of FIG. 2, the FIG. 3 system being an electro-hydraulic-electronic system in comparison with the mechanical-pneumatic and hydraulic system of FIG. 2. Elements in FIG. 3 which are identical to the corresponding elements of FIG. 2 carry the same numerals. However, it is apparent that the system of FIG. 3 has been vastly simplified relative to the system of FIG. 2, and in particular the autopilot portion B. In this case the fluid sensitive means for sensing the speed ratio between the primary and secondary sides of the torque converter and also the various valves for delivering fluid to the lines 84 and 85 of the valve 80 and 94 and 95 of the brakes 17 and 18 have been replaced by simplified solenoid operated valves H for direct drive, D for direct drive, SR for single rotation drive (i.e., engagement of brake 17), DR for double rotation (i.e., engagement of the brake 18) and R for reverse. In addition, the system includes electronic pick-ups 125 and 127 for electronically sensing the speeds of the primary and secondary sides of the torque converter and transmitting these signals via lines 126 and 128, respectively, to the driver's valve 140 which transmits the appropriate signals to the said solenoid valves.

The throttle lever 150 engages a switch 151 in the neutral position and engages a spring position limit device and a switch 153 in the opposite end position, i.e., the kick-down position. Lines 152 and 154 transmit the appropriate signals from switches 151 and 153 to the driver's valve 140. In addition, a pressure switch 155 is connected via line 156 to the driver's valve 140 for hydraulic braking.

Also included is an automatic and remote control box 145 of bi-metal containing a multiple circuit switch and three warning lamps I, II and III as described in FIG. 2, with one double, and one electronic control device having the following components:

a. A component giving an impulse above a certain ratio between impulses from the primary and secondary sides, having a hysteresis between up-shift and down-shift, where this hysteresis, if possible, should be speed-ratio responsive.

b. A component giving an impulse at a certain ratio between impulses from the primary and secondary sides.

c. Components giving control impulses above certain secondary side speeds.

d. A component overruling the connection of the pump in hydraulic braking and/or direct, when the switch indicating connection of reverse gear is not in end positions.

e. A component closing the circuit for hydraulic braking, only when direct drive is connected.

f. A component taking impulses from the throttle end position contact for kick-down for positively disconnecting direct drive, depending on the position of the highest secondary indicator position.

g. A component taking impulses from the idling throttle position switch allowing direct dirve to be connected down to the lowest secondary side speed component indicator. (This can possibly be connected to the hydraulic braking when the throttle is not in neutral.)

The above described functions would be improved, if the electronic control device would be able — without any loss of safety in function — to make the disconnection of the direct drive variably dependable on the throttle position, that is at higher throttle opening, higher disconnection point, and at lower throttle opening, lower disconnection point, following the allowed minimum engine load/speed curve.

Although the invention has been described in considerable detail with respect to preferred embodiments thereof, it will be apparent that the invention is capable of numerous modifications and variations apparent to those skilled in the art without departing from the spirit and scope of the invention.

I claim:

1. A remote control system for a transmission adapted for use in a vehicle and including a torque converter of the type having a pump member connected to an input shaft, a guide member and a turbine member connected to an output shaft, and wherein one of the pump or turbine members is releasable from its respective shaft, and including brake means for controlling the speed of rotation of the guide member, and a forward/reverse gear, said system comprising:

sensing means for sensing the ratio $n2/n1$ which is the rotational speed of the output shaft to the rotational speed of the input shaft, pressure means for pressurizing fluid and selectively transmitting said pressurized fluid to main valve means for connecting and disconnecting said releasable member and said guide member brake means, operating means responsive to the sensing means for controlling the main valve means for thus controlling the flow of said pressurized fluid through said main valve means to the releasable member and the brake means, and including a remote control means for controlling the operating means, said remote control means located remote from the transmission and adapted to be operated by the driver of the vehicle and movable to a plurality of positions for automatically operating the operating means to connect or disconnect the releasable member, connect or disconnect the brake means and to select either forward or reverse.

2. The system of claim 1, said remote control means being a valve for controlling the flow of control fluid.

3. The system of claim 2, said remote control valve being a pneumatic valve, the said control fluid being pneumatic fluid.

4. The system of claim 1, said operating means including a plurality of control valves located in the pressure lines of the pressure means for controlling the flow of said pressurized fluid to the valve means.

5. The system of claim 4, including pneumatic fluid lines between the remote control valve and the said plurality of control valves, said remote control valve being movable between neutral, forward and reverse positions, each position causing a different flow of said pneumatic fluid for controlling different ones of said control valves.

6. The system of claim 5, said remote control valve further including a forward-neutral position and a reverse-neutral position in which the pressurized fluid controls the said control valve to engage said brake means and release the releasable member.

7. The system of claim 6, said remote control valve means including means for preventing movement thereof into reverse or reverse-neutral unless the vehicle is standing still.

8. The system of claim 5, said brake means including first brake means for single rotation and second brake means for double rotation, said operating means including means for automatically operating the braking means for movement between single rotation and double rotation when $n2/n1$ equals a predetermined value.

9. The system of claim 5, said torque converter including a direct drive connection for directly connecting together the input shaft and the output shaft, and said operating means including means for connecting direct dirve when $n2/n1$ equals a predetermined value.

10. The system of claim 5, including a throttle also located remote from the transmission and adapted to be operated by the vehicle driver, means for delivering said pneumatic fluid to the throttle, said throttle movable to positions to transmit said pneumatic fluid to operate at least some of said control valves for further controlling the operation of the torque converter.

11. The system of claim 1, said sensing means including means for electrically sensing $n2/n1$ and transmitting a signal indicative thereof, said operating means including a plurality of electrically operated fluid valves operable in response to the said signal received from the sensing means.

12. The system of claim 11, said remote control means including means for selectively electrically operating said fluid valves for connecting or disconnecting the releasable member, connecting or disconnecting the brake means and for selecting forward or reverse.

13. The system of claim 12, said remote control means including forward, neutral and reverse positions.

14. The system of claim 13, said remote control means further including a forward-neutral position and a reverse-neutral position in which the pressurized fluid controls the said fluid valves to engage said brake means and release the releasable member.

15. The system of claim 14, said remote control means including means for preventing movement thereof into reverse or reverse-neutral positions unless the vehicle is standing still.

16. The system of claim 12, including a throttle also located remote from the transmission and adapted to be operated by the vehicle driver, electrical switch means operated by said throttle to transmit electrical signals to operate at least some of said fluid valves for further controlling the operation of the torque converter.

* * * * *